United States Patent [19]

Dave et al.

[11] Patent Number: 5,251,001
[45] Date of Patent: Oct. 5, 1993

[54] REFLECTED OPTICAL POWER FIBER TEST SYSTEM

[75] Inventors: Rajesh P. Dave, Greyslake; Ernst B. Riemann, Libertyville, both of Ill.

[73] Assignee: Teradyne, Inc., Boston, Mass.

[21] Appl. No.: 793,595

[22] Filed: Nov. 18, 1991

[51] Int. Cl.⁵ .......................................... G01N 21/88
[52] U.S. Cl. .............................. 356/73.1; 250/227.11
[58] Field of Search ................... 356/73.1; 250/227.11

[56] References Cited

U.S. PATENT DOCUMENTS

| | | | |
|---|---|---|---|
| 4,027,561 | 6/1980 | Steensma | 356/73.1 X |
| 4,623,788 | 11/1986 | Kern et al. | 250/227.11 |
| 4,716,288 | 12/1987 | Doi | 356/73.1 |
| 4,838,690 | 6/1989 | Buckland et al. | 356/73.1 |
| 4,883,954 | 11/1989 | Esser et al. | 250/231 R |
| 4,899,045 | 2/1990 | Kramer | 356/73.1 X |

FOREIGN PATENT DOCUMENTS

WO90/6498  6/1990  World Int. Prop. O. ......... 356/73.1

OTHER PUBLICATIONS

Takasugi, H., et al., "Design and Evaluation of Automatic Optical Fiber Operation Support System", *International Wire & Cable Symposium Proceedings 1990*, pp. 623–629.

Shinopoulos, G., et al., "Monitoring Systems for Fiber Optic Cable Plant", Fotec, Inc., *1991 National Fiber Optic Engineers Conference*, vol. 2, pp. 81–86.

Koyamada, yahei, et al., "Basic Concepts of Fiber Optic Subscriber Loop Operation Systems", *1990 IEEE*, pp. 1540–1544.

*Primary Examiner*—Vincent P. McGraw

[57] ABSTRACT

A system for testing an optical fiber used in communications including a light source connectable to provide light to one end of a fiber under test, an optical power detector connectable to receive light from the same end of the fiber under test, a reflector at the other end of the fiber under test, and monitoring means operatively connected to the light source and detector to make a baseline measurement of optical power reflected by the reflector and subsequent measurements of optical power reflected by the reflector and compare the subsequent measurements with the baseline measurement to determine if there has been a change in optical power reflected by the reflector, the baseline measurement and the subsequent measurements involving no more than a single pulse of light from the light source.

24 Claims, 2 Drawing Sheets

REFLECTED OPTICAL POWER FIBER TEST SYSTEM

BACKGROUND OF THE INVENTION

The invention relates to testing and monitoring optical fibers used in communications, e.g., in the public telephone network.

The telephone network includes connections of users' telephones to a central office (often referred to as the subscriber loop and currently typically implemented by pairs of copper wires) and connections between central offices, needed when the two parties to a call are connected to different central offices. Optical fibers have been extensively used to provide communication between different central offices. Optical fibers have also been used to provide communication from a central office to a remote digital terminal (RDT), and currently copper wires are then used over a short distance to make the connections from the RDT to the user's telephones. RDTs might, e.g., be located at a business customer's premises or at a remote curbside location that serves a number of residences. With the desire to increase bandwidth and to decrease the investment in copper wire in the future, the use of optical fibers in the subscriber loop is expected to increase.

Owing to the differences between copper wires and optical fibers, the automatic telephone test systems currently used to test large numbers of copper telephone lines at high speed cannot be used to test optical fiber telephone lines. Takasugi, H. et al., "Design and Evaluation of Automatic Optical Fiber Operation Support System", *International Wire & Cable Symposium Proceedings* 1990, pp. 623-629, describes a system for testing optical fiber cable networks automatically by remote control. The system includes a test controller that is located at the central office and is connected to a fiber under test in the subscriber loop via a fiber selector and an optical branch module that includes an optical coupler to the fiber under test. Filter-embedded connectors are used between the fibers and the units at the remote ends of the fibers to provide filters that transmit operating signals at 1310 nm wavelength and reflect test light at 1550 nm wavelength. The test controller includes an optical time domain reflectometer (OTDR), an optical power meter (OPM) and a light source.

SUMMARY OF THE INVENTION

The invention features testing an optical fiber used in communication by providing a light source and detector at one end of the optical fiber (e.g., at a central office) and a reflector at the other end of the fiber (e.g., at a remote location). The light travels through the fiber to the reflector and back, and the power of reflected light is measured at the detector. A baseline measurement is obtained, and subsequent measurements are compared with the baseline measurement to determine if there has been a degradation of the fiber. The optical power measurement involves no more than a single pulse of light from the source, permitting a simple and rapid measurement to be made and monitoring of a large number of lines in a small amount of time. The reflector is small in size, inexpensive, maintenance free, and reliable, facilitating the monitoring of a large number of optical fibers at low cost.

The optical power measurements can be average power measurements based on a continuous wave of light from the source. Alternatively, the optical power measurements can be made by providing a single pulse of light that is substantially shorter in duration than the time to travel along the fiber and back and measuring the optical power at a time corresponding to the time it takes light to travel along the fiber and back. The average power/continuous wave mode of operation can desirably be used when the Fresnel and Rayleigh reflections along the fiber are small in comparison to the light reflected at the reflector. The pulsed mode of operation is not affected by these reflections and can be advantageously employed even when these reflections are substantial.

The fiber being tested can be a spare fiber that is not in use but is employed in a bundle of active fibers to act as an indicator of the integrity of the bundle; in this case the reflector can be a reflective metal surface provided at a terminating connector at the end of the fiber. Alternatively the fiber can be an active fiber; in this case different wavelengths are used for communication and testing; the reflective element is a reflective filter that passes the communicating wavelength and blocks the test wavelength, and a wavelength division multiplexer can be used at the central office to direct the communicating wavelength to the communications equipment and the test wavelength to the test apparatus.

In preferred embodiments an optical switch is used to selectively connect the light source and detector to one of a plurality of optical fibers. An optical splitter is used to connect the light source and detector to a single fiber. The light source is a laser diode that is controlled by a laser diode driver. The detector includes a photodiode that feeds a receiver that in turn feeds a signal processing stage that outputs an optical power signal.

Other advantages and features of the invention will be apparent from the following description of preferred embodiments thereof and from the claims.

DESCRIPTION OF THE PREFERRED EMBODIMENTS

The drawings will be described first.

DRAWINGS

STRUCTURE

Figure 1:
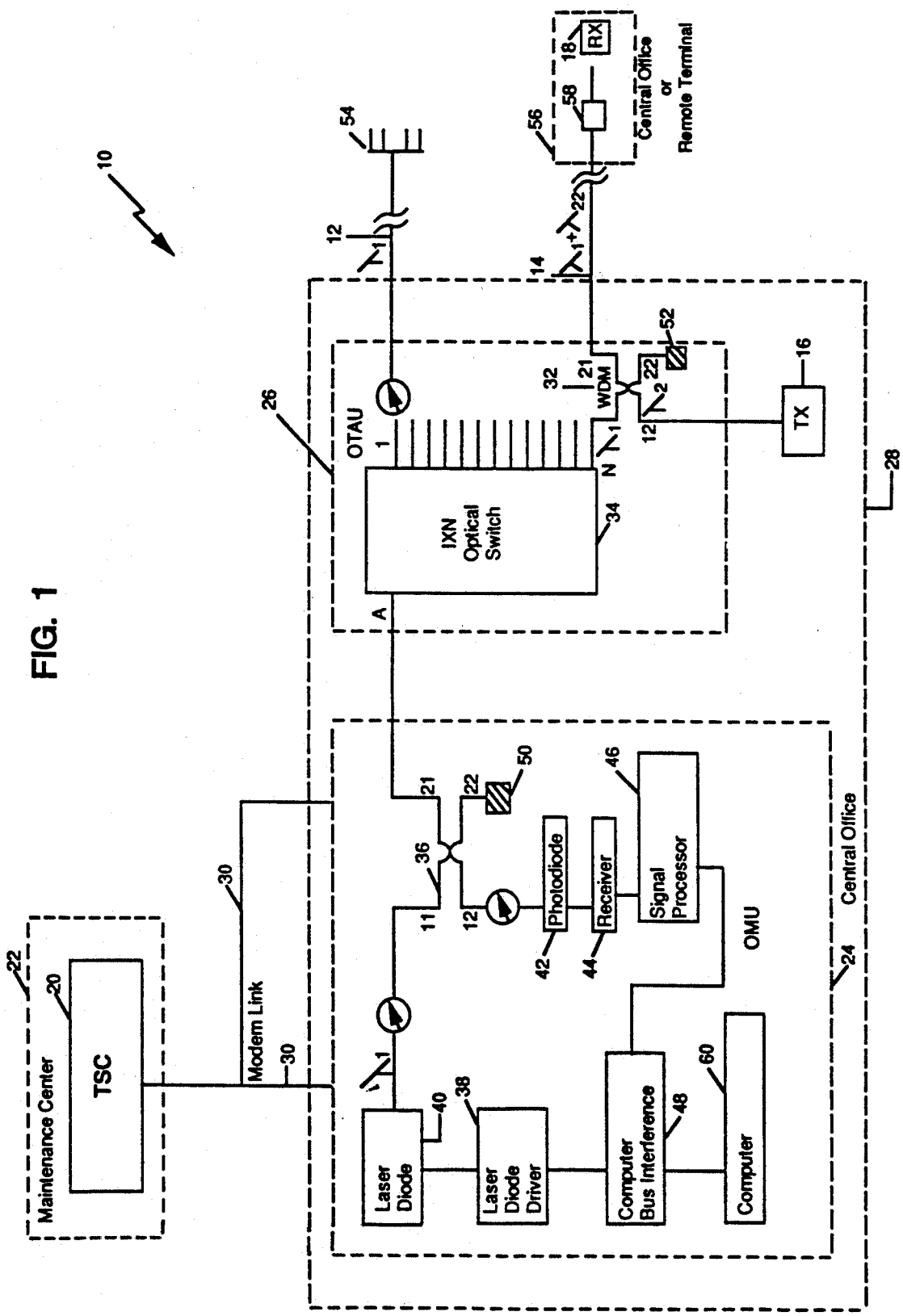
FIG. 1 is a block diagram of a system for testing optical fibers according to the invention.

Referring to FIG. 1, there is shown system 10 for testing optical fibers used in communications, e.g., in the public telephone network. The fiber under test (FUT) can be spare fiber 12, which is not connected to any telephone equipment at the remote end, or an active fiber 14, which is connected between transmitter 16 and receiver 18. (Alternatively, the transmitter could be located at the remote position, and the receiver could be located in the central office with the test apparatus.)

System 10 includes test system controller (TSC) 20, located at maintenance center 22, and optical measurement unit (OMU) 24 and optical test access unit (OTAU) 26, both of which are located in central office 28. TSC 20 includes a work station that receives information from and sends control commands to OMU 24 and OTAU 26 over modem links 30 or packet switched networks. Testing is coordinated and controlled from TSC 20, and dispatch orders can be generated at maintenance center 22 based upon test results.

Transmitter 16 serves the functions of concentration, cross-connection and electrical-to-optical conversion and is used to connect the signals on the active optical fiber to the telephone office switch and, ultimately, to a customer telephone at the other end of the communication (both not shown). Transmitter 16 is connected to active fiber 14 via wavelength division multiplexer (WDM) 32 (e.g., one available under the SWM-57-42-1-B-1-TR trade designation from Aster Corporation, Milford, Mass.). WDM 32 multiplexes and demultiplexes 1310 nanometers wavelength ($\lambda_2$), used for communications, and 1550 nanometers ($\lambda_1$), used for testing. (Other wavelengths could of course be used.) Combined wavelengths on active fiber 14 provided to WDM 32 port 2-1 are split up at WDM 32; the test wavelength light is passed through port 1-1 to 1XN optical switch 34, and the wavelength used for communication is passed through port 1-2 to transmitter 16. The 2-2 port of WDM 32 is terminated in a refractive index matching gel 52 for the purpose of absorbing and not reflecting the light at port 2-2.

1XN optical switch 34 has a single input connected to the 2-1 port of 3 dB splitter 36 (e.g., available under the SWB 3502 B1S trade designation from Aster Corporation) of OMU 24 and N outputs, one of which is shown connected to WDM 32 on FIG. 1 and another of which is shown connected to spare fiber 12 on FIG. 1. The other N minus 2 outputs could be connected to other additional spare fibers under test 12 or additional WDMs 32 connected to active fibers. Spare fiber 12 typically is a single fiber out of a bundle of optical fibers. The rest of the fibers in the bundle could be active fibers, and the spare fiber would be used as an indication of a condition that would affect all fibers in the bundle.

OMU 24 includes a laser diode driver 38 and laser diode 40 connected to provide a source of test light to splitter 36 via the 1-1 port. Laser diode 40 can, e.g., be a single-mode, fiber pig-tailed Fabry-Perot cavity laser diode module operating, e.g., at 1550 nm, assuming that communication is at 1310 nm. The 1-2 port of splitter 36 is connected to provide received light to photodiode 42, which is connected to provide an output to receiver 44, which in turn is connected to provide its output to signal processor 46. Photodiode 42 can, e.g., be a compound III-V fiber pig-tailed photodiode available from Epitaxx under the trade designation ETX75FJ. Receiver 44 includes a transimpedance preamplifier followed by one or several post amplifiers, followed by a low-pass electrical filter, followed by an analog-to-digital converter. Signal processor 46 is microprocessor based and outputs a digital signal indicating the measured power. Laser diode driver 38 and signal processor 46 are connected to computer bus interface 48 for control by computer 60 of the test procedure. The 2-2 port of splitter 36 is connected to a refractive index matching gel 50 for the purpose of absorbing all light at port 2-2 and not reflecting light at port 2-2.

At the remote end of spare fiber under test 12 is reflective element 54, e.g., a rear-ended mirror having gold deposited on the end of a fiber optic plug.

Receiver 18, at the remote end of active fiber 14, is located at either a central office or remote terminal at location 56. Receiver 18 is connected to active fiber 14 by reflective filter 58, which reflects the test wavelength at $\lambda_1$ and passes the communications wavelength at $\lambda_2$. Reflective filter 58, e.g., could be available from Amphenol Corporation under the trade designation 94599999-10085. While OMU 24 and OTAU 26 are shown in a common central office 28 on FIG. 1, they could be remote from each other.

Operation

In operation, OMU 24 is connected to one of the N fibers connected to optical switch 34 at one time. First a baseline measurement of reflected power is obtained for all fibers and stored, and then, at desired intervals, the power is measured for each of the fibers in turn and compared with the base line measurements in order to determine if there has been a change that indicates the possibility of a deterioration of any of the fibers. The comparisons can be done automatically or manually. During such testing and monitoring, system 10 can be operated in the continuous wave mode of operation or in the single-pulse mode of operation.

Figure 2:
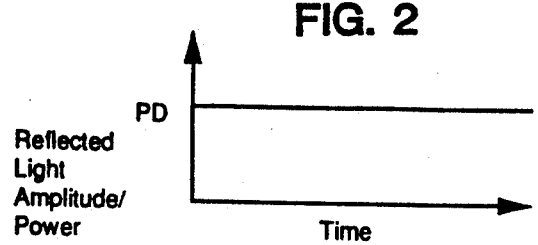
FIG. 2 is a graph of detected optical power versus time during a continuous wave mode of operation of the FIG. 1 system.

In the continuous-wave mode of operation, laser diode 40 provides light at wavelength $\lambda 1$ continuously under the control of host computer 60. The test light enters splitter 36 at port 1-1, and 50% of the light leaves through port 2-1, and 50% leaves through port 2-2. The light through port 2-1 is provided to optical switch 34 and to the connected fiber under test 12 or 14. Assuming that spare fiber 12 is connected, the light travels down fiber under test 12 to reflective element 54, where the light is then reflected back down fiber 12 through switch 34 to port 2-1 of optical splitter 36. 50% of the return light goes to port 1-1, and 50% goes to port 1-2 and is transmitted to photodiode 42. FIG. 2 snows the optical power detected at photodiode 42 during the continuous wave mode of operation. Photodiode 42 provides a current signal having a magnitude proportional to the optical power $P_D$ detected by it. The current signal is converted by the transimpedance amplifier of receiver 44 to a voltage signal, which in turn is amplified and converted via the A/D converter of receiver 44 to a digital binary number provided to signal processing module 46. Signal processor 46 provides an output that is an average of the digital inputs that have been received by it between two consecutive instructions from computer 60, one instructing processor 46 to start averaging and the other instructing processor 46 to stop averaging. The output of signal processor 46 is read by computer 60.

Figure 3:
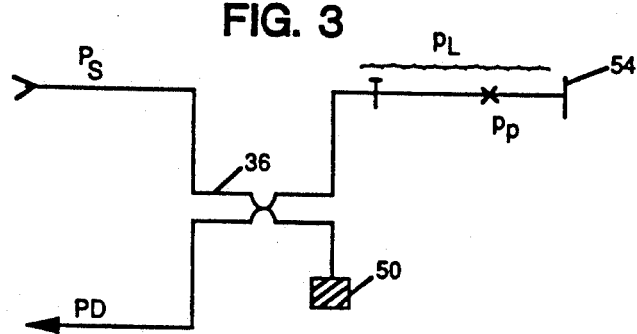
FIG. 3 is a diagram showing power levels and losses during optical fiber testing.

Referring to FIG. 3, this figure shows the losses in optical power during measurement. The optical power $P_s$ is the power provided to optical splitter 36 at port 1-1 from laser diode 40. $P_L$ is the total optical power loss in traveling once along the fiber under test. $P_L$ includes losses due to splitter imperfections, reflector imperfections, splices, connectors, and any other time invariant causes. The baseline optical power (i.e., prior to an attenuative event change) $P_{D1}$ as provided to photodiode 42 is given by equation 1.

$$P_{D1} = P_S - 2P_L - 6 \, dB \qquad (1)$$

Optical power $P_{D2}$ detected by photodiode 42 in a subsequent measurement after an attenuative event change is given by equation 2.

$$P_{D2} = P_S - 2P_L - 2P_P - 6 \, dB \qquad (2)$$

where $P_p$ is the attenuation due to deterioration. From (1) and (2), $$P_P = (P_{D1} - P_{D2})/2 \quad (3)$$

The continuous mode of operation is only accurate when there are small Fresnel and Rayleigh reflections compared to the reflected power; e.g., 13 dB less than the $P_D$ gives less than 5% error.

Figure 4:
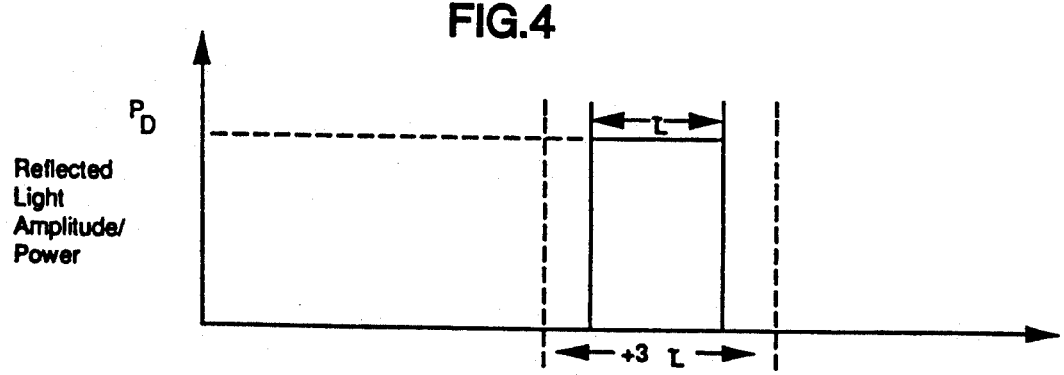
FIG. 4 is a graph of detected optical power versus time for a single-pulse mode operation of the FIG. 1 operation.

In the pulsed mode of operation, a ten-microsecond pulse is output by laser diode 40, and signal processor 46 measures the optical power $P_D$ at a time corresponding to the time it takes the light pulse to travel along the fiber and back. The light, once again, travels through splitter 36, through the fiber to the reflective element and back to photodiode 42, where the photodiode current signal output is converted to a voltage and amplified and digitized by receiver 44. Referring to FIG. 4, signal processor 46 takes samples during a gating period of $3\tau$, where $\tau$ is the ten microsecond pulse width. From the samples of $P_D$, signal processor 46 obtains the peak reflected power. Because the pulse amplitudes are being measured during the above mentioned time interval, Rayleigh and Fresnel reflections from the fiber under test do not contribute to $P_D$. Thus, the pulse mode of operation can be used when there are large Fresnel and Rayleigh reflections.

When testing active fiber 14, the operation is the same as for fiber 12, except that the light passes from optical switch 34 through WDM 32 in its travel to fiber 14. In the process, there is a small attenuation associated with travel through WDM 32.

The use of reflective element 54 or reflective filter 58 at the remote end is advantageous over the use of light source at the remote end in that it permits single-ended access and measurement, electrical power is not required at the remote end, a controlled environment is not required at the remote end, the use is maintenance free, and the component is small in size. Also, by using no more than a single pulse from laser diode 40 to make a power measurement, the measurement system is of reduced cost, and the measurement time is greatly reduced when compared to OTDR measurements. Nor does it suffer from saturation effects sometimes associated with OTDR measurements. The system also has lower cost advantages and higher reliability advantages when compared to using an optical source at the remote end.

Other embodiments of the invention are within the scope of the following claims. E.g., optical splitter 36 could be replaced by a bulk optics device, an opto-electronic integrated circuit switch (e.g., Ti:LiNbO$_3$) or an acousto-optic switch. Also, a single test system controller 20 can control a plurality of optical measurement units 24 located at different central offices 28.

What is claimed is:

1. A system for testing optical fibers used in communications comprising
   an optical switch connected to a plurality of fibers under test,
   a light source connectable through said optical switch to provide light to one end of one of said plurality of fibers under test at one time,
   an optical power detector connectable through said optical switch to receive light from said one end of said one of said plurality of fibers under test,
   reflectors at the other ends of said fibers under test,
   monitoring means operatively connected to said light source and detector to make a baseline measurement of optical power reflected by said reflectors and subsequent measurements of optical power reflected by said reflectors and to compare said subsequent measurements with said baseline measurements to determine if there has been a change in optical power reflected by said reflectors, and
   means to control said optical switch and monitoring means to sequentially connect said fibers and sequentially make said baseline measurements and sequentially make said subsequent measurements,
   each said baseline measurement and each said subsequent measurement involving no more than a single pulse of light from said light source and involving a power measurement made during a time period window that includes a time corresponding to the time it takes for light to travel to the reflector connected to said one fiber and back, said single pulse of light being substantially shorter in duration than the time to travel to said reflector and back.

2. The system of claim 1 wherein each said fiber under test is a spare fiber that is not in use but is employed in a respective bundle of active fibers to act as an indicator of conditions of the active fibers in said bundle.

3. The system of claim 2 wherein each said reflector is a reflective metal surface provided at a terminating connector at the end of a fiber under test.

4. The system of claim 1 wherein each said fiber under test is an active fiber, and said light source and detector operate at a test wavelength that is a different wavelength than the communicating wavelength used for communication.

5. The system of claim 4 wherein each said reflector is a reflective filter that passes the communicating wavelength and blocks the test wavelength.

6. The system of claim 5 further comprising, for each said fiber under test, a wavelength division multiplexer at said one end of said fiber to direct the communicating wavelength to and receive the communicating wavelength from a transmitter used in communication and to direct the test wavelength to and receive the test wavelength from said light source and detector.

7. The system of claim 1 wherein an optical splitter is used to connect said light source and detector to a single fiber.

8. The system of claim 1 wherein said light source is a laser diode that is controlled by a laser diode driver.

9. The system of claim 8 wherein said detector includes a photodiode that provides a current signal output and a receiver that converts said current signal output into a digital signal provided to said monitoring means.

10. The system of claim 1 wherein said light source and optical power detector and said monitoring means are located at a central office.

11. The system of claim 10 further comprising a remotely located test system controller that controls said light source, optical power detector, and monitoring means.

12. The system of claim 10 further comprising an optical test system access unit to connect said light source and optical power detector to said fiber under test.

13. A method for testing optical fibers used in communications comprising sequentially, for each of a plurality of fibers under test connected to an optical switch, obtaining baseline measurements by provide light through said optical switch to one end of one of said plurality of fibers under test, reflecting said light at the other end of said one of a plurality of fibers under test, detecting reflected light from said one end of said one of a plurality of fibers under test, and sequentially, for each of a plurality of fibers under test connected to said optical switch, obtaining subsequent measurements by providing light through said optical switch to one end of one of said plurality of fibers under test, reflecting said light at the other end of said one of a plurality of fibers under test, detecting reflected light from said one end of said one of a plurality of fibers under test, and comparing said subsequent measurements with said baseline measurements to determine if there has been a change in optical power at any said fiber under test, each said baseline measurement and each said subsequent measurement involving no more than a single pulse of light from said light source and involving a power measurement made during a time period window that includes a time corresponding to the time it takes for light to travel to the reflector connected to said one fiber and back, said single pulse of light being subsequentially shorter in duration than the time to travel to said reflector and back.

14. The method of claim 13 wherein each said fiber under test is a spare fiber that is not in use but is employed in a respective bundle of active fibers to act as an indicator of conditions of the active fibers in said bundle.

15. The method of claim 14 wherein said reflecting is by a reflective metal surface provided at a terminating connector at the end of each fiber under test.

16. The method of claim 13 wherein each said fiber under test is an active fiber, and said light that is provided to and detected at said fiber is at a test wavelength that is a different wavelength than the communicating wavelength used for communication.

17. The method of claim 16 wherein said reflecting is by a reflective filter that passes the communicating wavelength and blocks the test wavelength.

18. The method of claim 17 wherein a wavelength division multiplexer is provided at said one end of each said fiber to direct the communicating wavelength to and receive the communicating wavelength from a transmitter used in communication and to direct the test wavelength to and receive the test wavelength from a light source and detector.

19. The method of claim 13 wherein an optical splitter is used to connect a light source and detector to a single fiber.

20. The method of claim 13 wherein said light is provided by a laser diode that is controlled by a laser diode driver.

21. The method of claim 20 wherein said detecting is by a photodiode that provides a current signal output and a receiver that converts said current signal output into a digital signal.

22. The method of claim 13 wherein said light is provided by a light source and said reflected light is detected by an optical power detector that are both located at a central office.

23. The method of claim 22 wherein a remotely located test system controller controls said light source and optical power detector.

24. The method of claim 22 wherein an optical test system access unit connects said light source and optical power detector to each said fiber under test.

* * * * *

UNITED STATES PATENT AND TRADEMARK OFFICE
CERTIFICATE OF CORRECTION

PATENT NO. :   5,251,001
DATED      :   October 5, 1993
INVENTOR(S):   Rajesh P. Dave and Ernst B. Riemann It is certified that error appears in the above-identified patent and that said Letters Patent is hereby corrected as shown below:

Column 4, line 36, "snows" should be --shows--; and

Column 7, line 32, "subsequentially" should be --substantially--.

Signed and Sealed this

Fifth Day of April, 1994

*Attest:*

BRUCE LEHMAN

*Attesting Officer*   *Commissioner of Patents and Trademarks*